United States Patent
Elmaghraby et al.

(10) Patent No.: US 10,992,335 B2
(45) Date of Patent: Apr. 27, 2021

(54) METHODS AND TRANSCEIVERS FOR REDUCING A DISTORTION COMPONENT WITHIN A BASEBAND RECEIVE SIGNAL

(71) Applicant: Apple Inc., Cupertino, CA (US)

(72) Inventors: Ahmed Elmaghraby, Neubiberg (DE); Ram Kanumalli, Linz (AT); Werner Schelmbauer, Steyr (AT); Stefan Herzinger, Sauerlach (DE); Peter Noest, Munich (DE)

(73) Assignee: Apple Inc., Cupertino, CA (US)

( * ) Notice: Subject to any disclaimer, the term of this patent is extended or adjusted under 35 U.S.C. 154(b) by 25 days.

(21) Appl. No.: 16/095,761

(22) PCT Filed: Jun. 1, 2017

(86) PCT No.: PCT/US2017/035334
§ 371 (c)(1),
(2) Date: Oct. 23, 2018

(87) PCT Pub. No.: WO2018/004968
PCT Pub. Date: Jan. 4, 2018

(65) Prior Publication Data
US 2020/0119763 A1   Apr. 16, 2020

(30) Foreign Application Priority Data
Jul. 1, 2016  (EP) .................................... 16177591

(51) Int. Cl.
*H04B 1/525*    (2015.01)
*H04B 1/12*     (2006.01)

(52) U.S. Cl.
CPC ............. *H04B 1/525* (2013.01); *H04B 1/123* (2013.01)

(58) Field of Classification Search
CPC ................................. H04B 1/525; H04B 1/123
See application file for complete search history.

(56) References Cited

U.S. PATENT DOCUMENTS

| 6,675,004 | B1 | 1/2004 | Waylett |
| 8,200,181 | B1 | 6/2012 | Khlat |
| 2008/0242245 | A1* | 10/2008 | Aparin .................. H04B 1/525 455/126 |
| 2010/0260077 | A1 | 10/2010 | Nakatani |
| 2011/0299575 | A1* | 12/2011 | Aoulad Ali ............. H04B 1/10 375/219 |

(Continued)

*Primary Examiner* — Freshteh N Aghdam
(74) *Attorney, Agent, or Firm* — Kowert, Hood, Munyon, Rankin & Goetzel, P.C.

(57) ABSTRACT

A transceiver for reducing a distortion component within a baseband receive signal is provided. The distortion component is caused by a baseband transmit signal. The transceiver includes a filter configured to filter the baseband transmit signal using a configurable transfer function to generate a modified baseband transmit signal. The configurable transfer function is based on a leakage component in the baseband receive signal, wherein the leakage component is caused by the baseband transmit signal. The transceiver further includes a processing unit configured to generate, based on the modified baseband transmit signal, an envelope signal representing the envelope of the modified baseband transmit signal. Moreover, the transceiver includes a combiner configured to combine the baseband receive signal and a signal related to the envelope signal.

15 Claims, 6 Drawing Sheets

(56) References Cited

U.S. PATENT DOCUMENTS

| | | | |
|---|---|---|---|
| 2012/0140685 A1* | 6/2012 | Lederer | H04L 27/3854 370/286 |
| 2013/0155911 A1* | 6/2013 | Kahrizi | H04B 1/525 370/277 |
| 2014/0269864 A1 | 9/2014 | Aparin | |
| 2014/0269991 A1 | 9/2014 | Aparin | |

* cited by examiner

METHODS AND TRANSCEIVERS FOR REDUCING A DISTORTION COMPONENT WITHIN A BASEBAND RECEIVE SIGNAL

FIELD

Examples relate to distortion cancellation in baseband receive signals. In particular, examples relate to methods and transceivers for reducing a distortion component within a baseband receive signal.

BACKGROUND

In communication devices where a transmit path and a receive path share the same antenna, an intermediate device (e.g. a duplexer) may be provided to connect the transmit path and the receive path to the antenna. For example, a duplexer may separate different frequency bands used for transmission and reception of radio frequency signals by means of frequency-selective filter elements. For example, a first frequency band may be used by the transmit path for transmitting radio frequency signals, whereas a second frequency band may be used by the receive path for receiving radio frequency signals. A distance between a frequency band for transmission and a frequency band for reception is called "duplex distance". For example, a duplex distance may be 30 MHz for Long Term Evolution (LTE) frequency band 17. In particular, the transmit path and the receive path may be operated simultaneously, i.e., in Frequency-Division Duplexing (FDD) mode.

A duplexer should provide an adequate rejection of signal components related to transmission within a frequency band for reception. However, when a transmission signal is provided to the duplexer, leakage to the frequency band used for signal reception may occur. Thus, an undesired leakage component may be caused in a receive signal and yield significant transmit power in the receive signal. Accordingly, a signal containing a desired receive signal component and the undesired leakage component related to a baseband transmit signal may be provided to a subsequent receiver path of the transceiver which may even result with the desired receive signal component being unrecoverable.

InterModulation Distortions (IMD) may be generated by a receive path receiving a signal having different frequency components. For example, unwanted signal components may be present within a baseband receive signal generated by the receive path resulting from the non-linearity of the same. Referring to the above example, a second order non-linearity of the receive path may cause demodulation of the undesired leakage component into the baseband receive signal. In this event, the generated undesired signal components are referred to as second order IMD components. The second order IMD component consists substantially of the squared envelope of the undesired leakage component. The second order IMD components may lower a Signal-to-Noise Ratio (SNR) of the baseband receive signal.

For Carrier Aggregation (CA), a transceiver may comprise a single receive path for each component carrier and multiple clock domains may be used in the receiving section of the transceiver (e.g. a dedicated local oscillator signal for a mixer of the respective receive path). Due to intermixing of frequencies from the multiple clock domains, a spur may occur at the mixer of a receive path. A spur is an undesired signal component occurring in addition to the dedicated local oscillator signal at an input of the mixer (e.g. due to crosstalk between the receive paths). Depending on the chosen carrier frequencies, the spur may have a frequency which is similar to a frequency of the undesired leakage component. Accordingly, the mixer may down-mix the undesired leakage component to the baseband due to the spur. The down-mixed leakage component may overlap with the down-mixed desired receive signal component and degrade the SNR of the baseband receive signal.

Hence, there may be a desire for reducing distortion components within a baseband receive signal.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
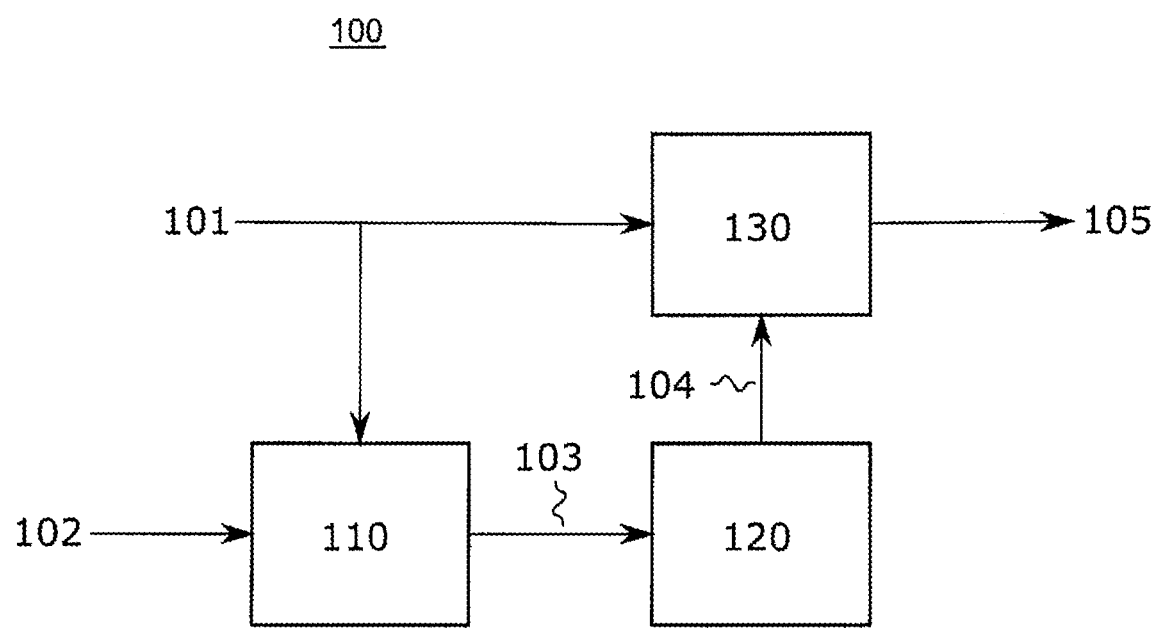
FIG. 1 illustrates a first example of a transceiver for reducing a distortion component within a baseband receive signal.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent", to name just a few examples).

The terminology used herein is for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong, unless expressly defined otherwise herein.

In the following, various examples relate to devices (e.g. cell phone, base station) or components (e.g. transmitter, transceiver) of devices used in wireless or mobile communications systems. A mobile communication system may, for example, correspond to one of the mobile communication systems standardized by the 3rd Generation Partnership Project (3GPP), e.g. Global System for Mobile Communications (GSM), Enhanced Data rates for GSM Evolution (EDGE), GSM EDGE Radio Access Network (GERAN), High Speed Packet Access (HSPA), Universal Terrestrial Radio Access Network (UTRAN) or Evolved UTRAN (EU-TRAN), LTE or LTE-Advanced (LTE-A), or mobile communication systems with different standards, e.g. Worldwide Interoperability for Microwave Access (WIMAX) IEEE 802.16 or Wireless Local Area Network (WLAN) IEEE 802.11, generally any system based on Time Division Multiple Access (TDMA), Frequency Division Multiple Access (FDMA), Orthogonal Frequency Division Multiple Access (OFDMA), Code Division Multiple Access (CDMA), etc. The terms mobile communication system and mobile communication network may be used synonymously.

The mobile communication system may comprise a plurality of transmission points or base station transceivers operable to communicate radio signals with a mobile transceiver. In these examples, the mobile communication system may comprise mobile transceivers, relay station transceivers and base station transceivers. The relay station transceivers and base station transceivers can be composed of one or more central units and one or more remote units.

A mobile transceiver or mobile device may correspond to a smartphone, a cell phone, User Equipment (UE), a laptop, a notebook, a personal computer, a Personal Digital Assistant (PDA), a Universal Serial Bus (USB)-stick, a tablet computer, a car, etc. A mobile transceiver or terminal may also be referred to as UE or user in line with the 3GPP terminology. A base station transceiver can be located in the fixed or stationary part of the network or system. A base station transceiver may correspond to a remote radio head, a transmission point, an access point, a macro cell, a small cell, a micro cell, a pico cell, a femto cell, a metro cell etc. The term small cell may refer to any cell smaller than a macro cell, i.e. a micro cell, a pico cell, a femto cell, or a metro cell. Moreover, a femto cell is considered smaller than a pico cell, which is considered smaller than a micro cell. A base station transceiver can be a wireless interface of a wired network, which enables transmission and reception of radio signals to a UE, mobile transceiver or relay transceiver. Such a radio signal may comply with radio signals as, for example, standardized by 3GPP or, generally, in line with one or more of the above listed systems. Thus, a base station transceiver may correspond to a NodeB, an eNodeB, a BTS, an access point, etc. A relay station transceiver may correspond to an intermediate network node in the communication path between a base station transceiver and a mobile station transceiver. A relay station transceiver may forward a signal received from a mobile transceiver to a base station transceiver, signals received from the base station transceiver to the mobile station transceiver, respectively.

The mobile communication system may be cellular. The term cell refers to a coverage area of radio services provided by a transmission point, a remote unit, a remote head, a remote radio head, a base station transceiver, relay transceiver or a NodeB, an eNodeB, respectively. The terms cell and base station transceiver may be used synonymously. In some examples a cell may correspond to a sector. For example, sectors can be achieved using sector antennas, which provide a characteristic for covering an angular section around a base station transceiver or remote unit. In some examples, a base station transceiver or remote unit may, for example, operate three or six cells covering sectors of 120° (in case of three cells), 60° (in case of six cells) respectively. Likewise a relay transceiver may establish one or more cells in its coverage area. A mobile transceiver can be registered or associated with at least one cell, i.e. it can be associated to a cell such that data can be exchanged between the network and the mobile in the coverage area of the associated cell using a dedicated channel, link or connection. A mobile transceiver may hence register or be associated with a relay station or base station transceiver directly or indirectly, where an indirect registration or association may be through one or more relay transceivers.

FIG. 1 illustrates an example of a transceiver 100 for reducing a distortion component within a baseband receive signal 101, which is processed in a receive path of the transceiver 100.

The distortion component within the baseband receive signal 101 is caused by a baseband transmit signal 102 (e.g. processed in a transmit path of the transceiver 100). For example, the transceiver 100 (i.e. the transmit path of transceiver 100) may derive the baseband receive signal 101 from a Radio Frequency (RF) signal. The RF signal may comprise an undesired signal component and a desired signal component. The desired signal component may, e.g., be a desired downlink-component transmitted by a base station, whereas the undesired signal component may, e.g., be a leakage or crosstalk component caused by the baseband transmit signal 102. When a transmit path and a receive path of the transceiver 100 are coupled to a duplexer, the leakage or crosstalk component may, e.g., result from the duplexer's finite rejection of transmission signal components within a frequency band for reception. The distortion component and the leakage component may be caused by the undesired signal component of the RF signal, so that the distortion component within the baseband receive signal 101 is effectively caused by the baseband transmit signal 102.

The distortion component within the baseband receive signal 101 may, e.g., be a second order IMD. The distortion component within the baseband receive signal 101 may, hence, result from a non-linearity of the receive path. Accordingly, the SNR of the baseband receive signal 101 may degrade.

The transceiver 100 comprises a filter 110 configured to filter the baseband transmit signal 102 using a configurable transfer function in order to generate a modified baseband transmit signal 103. The configurable transfer function is based on a leakage component in the baseband receive signal 101. Also the leakage component in the baseband receive signal 101 is caused by the baseband transmit signal 102. The leakage component is different from the distortion component. For example, the leakage component may be generated via a (first) mechanism which is different from the (second) mechanism generating the distortion component. The leakage component may, e.g., be generated by downmixing the undesired signal component of the RF signal in the mixer in the receive path of the transceiver 100.

Using the leakage component in the baseband receive signal 101 for adapting the configurable transfer function of the filter 110 may allow to mimic the transfer function of the duplexer for the transmit signal into the receive path. In other words, the configurable transfer function of the filter may be adapted such that it imitates a transfer characteristic of a channel providing the leaked RF transmit signal to the receive path (e.g. a duplexer to which the transmit path and the receiver are connected to). Accordingly, the filter 100 may shape the baseband transmit signal 102 in a way that corresponds to the distortion introduced by the duplexer in order to generate the modified baseband transmit signal 103.

Further, the transceiver 100 comprises a processing unit 120 configured to generate, based on the modified baseband transmit signal 103, an envelope signal 104 representing the envelope of the modified baseband transmit signal 103. For example, the processing unit may be configured to square the modified baseband transmit signal 103 in order to provide the envelope signal 104.

By extracting the envelope of the modified baseband transmit signal 103, a signal component similar to the distortion component in the baseband receive signal 101 may be generated. For example, for the distortion component within the baseband receive signal 101 being a second order IMD, extracting the envelope of the modified baseband transmit signal 103 allows to mimic the non-linear processes in the transceiver's receive path causing the second order IMD. Accordingly, the envelope signal 104 or a signal related to the envelope signal 104 (e.g. a delayed replica of the envelope signal 104) may comprise a signal component which is similar to the distortion component within the baseband receive signal 101.

Hence, the transceiver 100 further comprises a combiner 130 configured to combine the baseband receive signal 101 and the signal related to the envelope signal 104. For example, the combiner may be implemented as an adder. The transceiver 100 reduces the distortion component in the baseband receive signal 101 by modifying the baseband receive signal 101 based on the signal related to the envelope signal 104. Accordingly, a corrected baseband receive signal 105 may be provided by the transceiver 100.

In some examples, the transceiver 100 may further comprise a correlation unit configured to correlate the modified baseband transmit signal 103 and a signal related to the leakage component in the baseband receive signal 101, wherein the filter 110 is further configured to adapt the configurable transfer function based on a correlation result. The signal related to the leakage component may, e.g., be a delayed and/or filtered and/or frequency shifted replica of the baseband receive signal 101, which comprises the leakage component. By correlating the modified baseband transmit signal 103 and the signal related to the leakage component (e.g. by determining a difference between both signals), and adapting the configurable transfer function based on the correlation result (e.g. the difference between both signals), the configurable transfer function may be adapted such that it generates a (almost ideal) replica of the leakage component from the baseband transmit signal 102.

The configurable transfer function may in some examples, e.g., be a complex transfer function.

The processing unit 120 is in some examples configured to generate the envelope signal 104 DC-balanced. In other words, the processing unit 120 may comprise a sub-unit configured to remove DC from the envelope signal 104. Removing the DC from the envelope signal 104 may allow to better mimic the shape of the distortion component.

In other words, the transceiver 100 may allow to actively estimate the transfer function of the duplexer and to construct the leaked transmit (TX) signal from the original TX data.

This estimated leaked TX signal is then used as the basis signal for the TX second order IMD interference cancellation. Therefore, the transfer function of the duplexer is estimated by an adaptive method utilizing the leaked TX signal present at, e.g., the output signal of an Analog-to-Digital Converter (ADC) of the transceiver's receive path. The estimated transfer function of the duplexer is then used to shape the original TX data. The shaped signal's envelope is extracted and then, e.g., subtracted from the baseband receive signal to mitigate the TX second order IMD interference.

The transceiver 100 may comprise one or more additional optional features corresponding to one or more aspects of the proposed concept or one or more examples described below.

Generally speaking, some examples relate to a means for reducing a distortion component within a baseband receive signal, wherein the distortion component is caused by a baseband transmit signal. The means comprises a means for filtering the baseband transmit signal using a configurable transfer function to generate a modified baseband transmit signal, wherein the configurable transfer function is based on a leakage component in the baseband receive signal, the leakage component being caused by the baseband transmit signal. Furthermore, the means comprises a means for generating, based on the modified baseband transmit signal, an envelope signal representing the envelope of the modified baseband transmit signal. The means further comprises a means for combining the baseband receive signal and a signal related to the envelope signal.

In some examples, the means may further comprise a means for correlating the modified baseband transmit signal and a signal related to the leakage component in the baseband receive signal, wherein the means for filtering the baseband transmit signal is further configured to adapt the configurable transfer function based on a correlation result.

The means for reducing a distortion component within a baseband receive signal may be implemented by a transceiver for reducing a distortion component described above or below (e.g. FIG. 1). The means for filtering the baseband transmit signal may be implemented by a filter described above or below (e.g. FIG. 1). The means for generating an envelope signal may be implemented by a processing unit described above or below (e.g. FIG. 1). The means for combining may be implemented by a combiner described above or below (e.g. FIG. 1).

Figure 2:
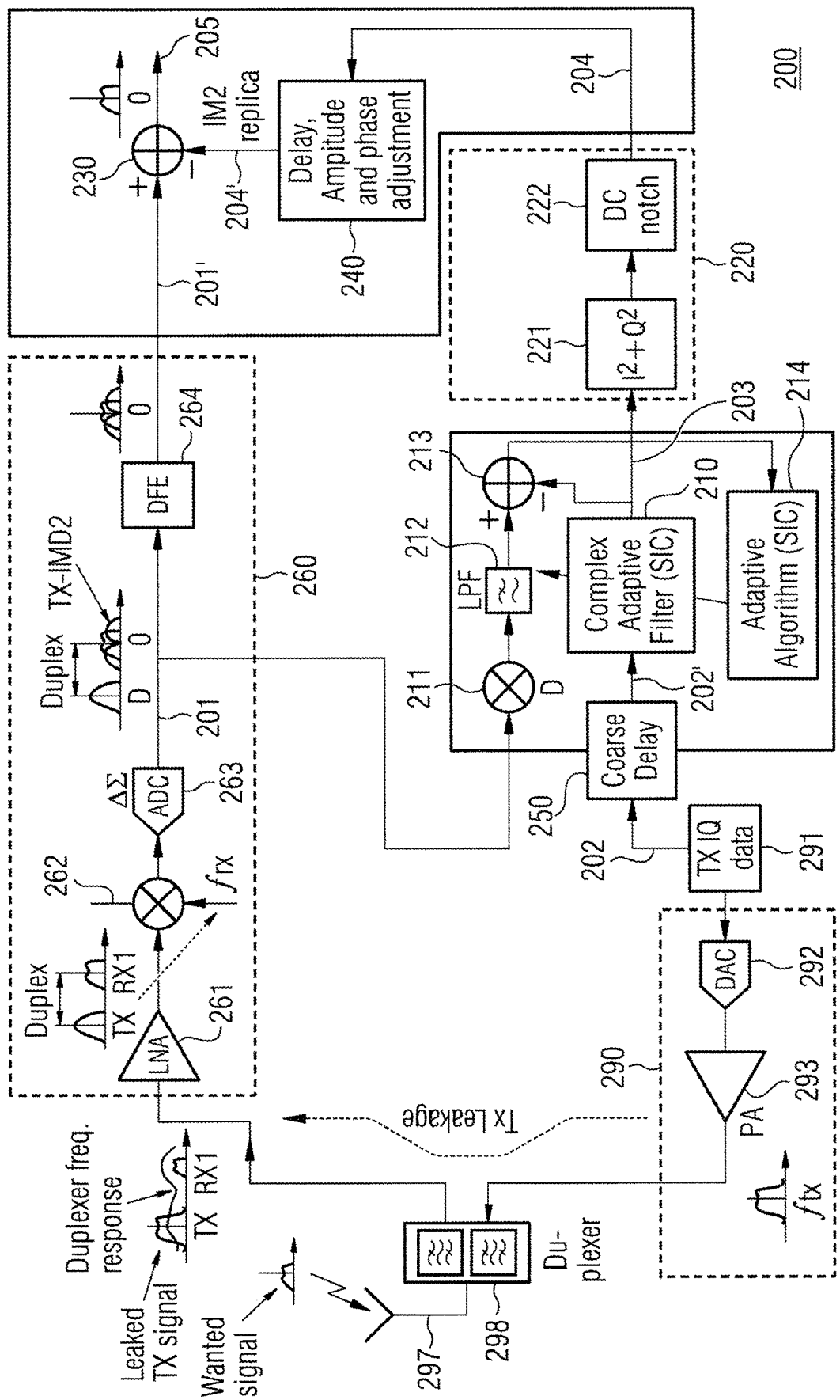
FIG. 2 illustrates a second example of a transceiver for reducing a distortion component within a baseband receive signal.

FIG. 2 illustrates another example of a transceiver 200 for reducing a distortion component within a baseband receive signal 201.

The transceiver 200 comprises a transmitter 290. A baseband transmit signal is provided to the transmitter 290 by baseband transmit data provision unit 291 (e.g. the baseband transmit data provision unit 291 may be part of a Digital Front-End (DFE) for baseband processing). For example, the baseband transmit signal may be provided in Cartesian representation, i.e., as data having an in-phase (I) component and a quadrature (Q) component, to the transmitter 290. Alternatively, the baseband transmit signal may be provided in polar representation. The transmitter 290 further comprises a RF mixing Digital-to-Analog Converter (DAC) 292 in order to convert the digital baseband transmit signal to an analog RF transmit signal. The analog RF transmit signal is supplied to a power amplifier (PA) 293 in order to generate an amplified RF transmit signal. The RF transmit signal has a carrier frequency $f_{tx}$ which is modulated with the baseband transmit signal.

The RF transmit signal is provided to a duplexer 298, which is connected to an antenna element 297, in order to radiate the RF transmit signal to the environment.

Further connected to the duplexer 298 is a receive path 260. The receive path receives a RF signal from the duplexer 298. The duplexer 298 should provide an adequate rejection of signal components related to transmission (e.g. originating from transmitter 290) within a frequency band for reception. However, the duplexer 298 cannot provide infinite isolation between both frequency bands, so that part of the RF transmit signal may leak into the frequency band for reception. Accordingly, a leaked RF transmit signal (TX Leakage) may be provided to the receive path 260. Hence, the leaked RF transmit signal may be considered as an undesired signal component of the RF signal provided to the receive path 260. In addition, the transceiver 200 receives a RF receive signal (Wanted signal) via the antenna 297 and provides it to the receive path 260 via the duplexer 298. Accordingly, the receive path 260 is provided with a RF signal which comprises a desired signal component, i.e., the RF receive signal, and an undesired signal component, i.e., the leaked RF transmit signal. In the frequency domain, the desired signal component and the undesired signal component of the RF signal are separated by the duplex distance.

The receive path 260 comprises a Low Noise Amplifier (LNA) 261, which may amplify a possibly weak RF signal while adding as little noise and distortion as possible to the signal.

The amplified RF signal is provided to a mixer 262. A local oscillator signal having a frequency $f_{rx}$ which is related to a frequency of the desired signal component of the RF signal is supplied to the mixer. For example, the frequency $f_{rx}$ of the local oscillator signal is tuned to a carrier frequency of the RF receive signal. Accordingly, the RF receive signal is down-mixed to the baseband by the mixer 262. However, also the leaked RF transmit signal is down-mixed by the mixer 262. Hence, the analog baseband receive signal comprises a desired baseband component related to the RF receive signal and an undesired leakage component related to the leaked RF transmit signal (i.e. the baseband transmit signal), wherein the desired baseband component and the undesired leakage component are again separated by the duplex distance.

Due to the non-linearity of the receive path 260 and the both signal components of the RF signal (i.e. RF receive signal and leaked RF transmit signal), a second order IMD component is generated as an additional distortion component within the analog baseband receive signal. As indicated in FIG. 2, the distortion component may overlap with the desired baseband component in the frequency domain. Accordingly, SNR of the analog baseband receive signal may be lowered due to the distortion component.

The analog baseband receive signal is converted to a digital signal by the ADC 263 in order to generate a digital baseband receive signal 201. However, apart from the desired baseband component also the leakage component and the distortion component are present in the digital baseband receive signal 201.

The digital baseband receive signal 201 is further processed by a DFE 264 for baseband processing, which is illustrated in FIG. 2 as part of the transceiver's receive path. The processing in the DFE 264 effectively acts as a low-pass filtering process, so that the DFE 264 filters (i.e. removes) the leakage component from the digital baseband receive signal 201. Accordingly, the filtered digital baseband receive signal 201' merely comprises the distortion component in addition to the desired baseband component.

In order to reduce the remaining distortion component within the filtered digital baseband receive signal 201', the transceiver 200 comprises further components described in the following.

The (digital) baseband transmit signal 202 provided by the baseband transmit data provision unit 291 is delayed by a delay element 250 in order to provide a delayed baseband transmit signal 202'. By delaying the baseband transmit signal 202, the processing time of the baseband transmit signal 202 in the transmit path 290 and the travelling time of the RF transmit signal through the duplexer may be taken into account for reducing the remaining distortion component within the filtered digital baseband receive signal 201'.

The baseband transmit signal 202' is filtered by a filter 210 using a configurable transfer function (e.g. a complex transfer function). In this respect, the configurable transfer function is based on the undesired leakage component within the baseband receive signal 201. In other words, the configurable transfer function is tuned based on the undesired leakage component. The filtered signal is output by the filter 210 as modified baseband transmit signal 203.

In order to tune the configurable transfer function, the digital baseband receive signal 201 is received by a frequency shifter 211 (e.g. a mixer). The frequency shifter 211 shifts the frequency of the leakage component within the digital baseband receive signal 201 to the frequency of the baseband transmit signal 202'. The frequency shifted digital baseband receive signal is then filtered by a low-pass filter 212 to remove (almost) all signal components from it except for the leakage component. Accordingly, a signal related to the leakage component in the baseband receive signal 201 is output by the low-pass filter 212. In other words, the signal related to the leakage component in the baseband receive signal 201 is based on an output signal of the ADC 263 in the receive path 260 of the transceiver 200.

The signal related to the leakage component in the baseband receive signal 201 is then correlated with the modified baseband transmit signal 203 in a correlation unit 213. For example, the correlation unit 213 may be an adder which subtracts the signal related to the leakage component in the baseband receive signal 201 and the modified baseband transmit signal 203 from each other. By correlating both signals, one may determine how well the filtering process in the filter 210 reproduces the channel providing the leaked RF transmit signal to the receive path 260. The correlation result (e.g. an error signal indicating the difference between the signal related to the leakage component in the baseband receive signal 201 and the modified baseband transmit signal 203) is provided to a processing unit 214 executing an adaptive algorithm for adapting the configurable transfer function of the filter 210. The processing unit 214 executing the adaptive algorithm is a control portion of the filter 210.

Based on the correlation result, the processing unit 214 executing the adaptive algorithm adapts (tunes) the configurable transfer function of the filter 210. Accordingly, the filter 210 may be operated adaptively in order to ensure an optimum reproduction of the channel providing the leaked RF transmit signal to the receive path 260.

The modified baseband transmit signal 203 is supplied to a processing unit 220 which is configured to generate an envelope signal 204 based on the modified baseband transmit signal 203, wherein the envelope signal 204 represents the envelope of the modified baseband transmit signal 203. Therefore, the processing unit 220 comprises a first sub-unit 221 configured to generate a signal representing the envelope of the modified baseband transmit signal 203 by squaring the modified baseband transmit signal 203. Further, the processing unit 220 comprises a second sub-unit 222 configured to remove DC from the squared modified baseband transmit signal. Accordingly, the envelope signal 204 is DC-balanced.

By extracting the envelope of the modified baseband transmit signal 203, a signal component having a similar shape as the distortion component in the baseband receive signal 201 may be generated. For example, for the distortion component within the baseband receive signal 201 being a second order IMD, extracting the envelope of the modified baseband transmit signal 203 may allow to reproduce the non-linear processes in the receive path 260 causing the second order 1 MB. Removing the DC may further allow to better mimic the shape of the distortion component. Accordingly, the envelope signal 204 may have a signal shape which is quite similar to the shape of the distortion component in the baseband receive signal 201, i.e., also similar to the distortion component in the filtered digital baseband receive signal 201'.

The envelope signal 204 is supplied to a signal adjustment unit 240 configured to generate a signal 204' related to the envelope signal. For generating the signal 204' related to the envelope signal, the signal adjustment unit 240 may, e.g., adjust an amplitude of the envelope signal 204, adjust a phase of the envelope signal 204, or delay the envelope signal 204. This may allow to mimic the linear distortions introduced into the filtered digital baseband receive signal 201' by the ADC 263 and the DFE 264.

The signal adjustment unit 240 may comprise a configurable transfer function. In this respect, the signal adjustment unit 240 is configured to correlate the distortion component within the baseband receive signal 201' and the signal 204' related to the envelope signal. By correlating both signals, one may determine how well the foregoing processing reproduces the mechanism causing the distortion component in the baseband receive signal 201'.

The signal adjustment unit 240 is configured to adapt the configurable transfer function based on a correlation result (e.g. an error signal indicating the difference between the distortion component within the baseband receive signal 201' and the signal 204' related to the envelope signal). Accordingly, the signal adjustment unit 240 may be operated adaptively in order to ensure an optimum replica of the distortion component (e.g. second order 1 MB component) within the baseband receive signal 201'.

In order to reduce (remove) the distortion component within the baseband receive signal 201', a combiner 230 combines the baseband receive signal 201' and the signal 204' related to the envelope signal. For example, the combiner 230 may be an adder configured to subtract the signal 204' related to the envelope signal from the baseband receive signal 201'. Since the signal 204' related to the envelope signal represents (essentially) a replica of the distortion component within the baseband receive signal 201', the distortion component within the baseband receive signal 201' may be reduced (removed/cancelled). Accordingly, a corrected baseband receive signal 205 may be output (generated) by the combiner 230, which contains (essentially) only the desired baseband component. Hence, a SNR of the corrected baseband receive signal 205 may be increased compared to the SNR of the baseband receive signal 201'.

The foregoing description of FIG. 2 may be summarized as follows: FIG. 2 depicts the generation of a second order IMD distortion and a digital cancellation architecture. Due to the limited isolation of the duplexer 298 some amount of the TX signal leaks into the receive path. Moreover, due to the non-linearity of the receive path 260 second order TX IMD is generated and interferes with the wanted signal component. Along with the wanted signal component, the leaked TX signal is also down converted by the mixer 262 and appears at the duplex offset after the ADC 263. The leaked TX signal is extracted and used to learn the TX-RX channel. This is followed by envelope extraction and second order IMD cancellation.

After the ADC 263, the received signal X [k] can be described as X [k]=W [k]+TX_IM2 [k]+TX_L [k], wherein W [k] is the wanted RX signal, TX_IM2 [k] is the second order IMD noise distorting the wanted signal and TX_L [k] is the leaked TX signal at the duplex offset. In the main path X [k] passes through the DFE 264, which may be simplified as a low-pass filter process generating a signal Y [k] which is given by Y [k]=W [k]+TX_IM2 [k].

The original TX signal TX [k] is first shaped in a way that corresponds to the duplexer distortion. For example, the leaked TX signal TX_L [k] at the duplex offset after the ADC 263 may be used. Although, this signal may be suppressed and heavily affected by the delta sigma noise of the ADC 263, there may be enough SNR in it to learn the TX-RX channel and shape the provided TX signal TX [k]. Once the original TX data is shaped to provide the linearly distorted signal S[k], the linearly distorted signal S[k] passes through envelope extraction process.

The envelope extraction process is followed by DC removal to provide the envelope signal Env [k] that has a similar shape as the second order IMD noise TX_IM2[k]. The received leaked signal TX_L [k] is similar to the leaked TX signal causing the second order 1 MB noise in the baseband receive signal, but it may be not exactly the same since the signal related to the leakage component L [k] has passed through further low-pass filtering in the analog baseband and the ADC.

Subsequently, those differences are adjusted in the signal adjustment unit 240. The linearly distorted envelope signal Env [k] is used as a base signal to cancel the second order IMD components TX_IM2 [k]. For example, a low tap count Least Mean Square (LMS) filter may be used to correct for the amplitude, phase, and/or delay between Env [k] and TX_IM2 [k]. Furthermore the adaptive filter may adjust the linear distortion introduced by the ADC 263 and the baseband filters (of DFE 264). In this way, the second order 1 MB may be cancelled and the SNR of the wanted signal may be restored.

Figure 3:
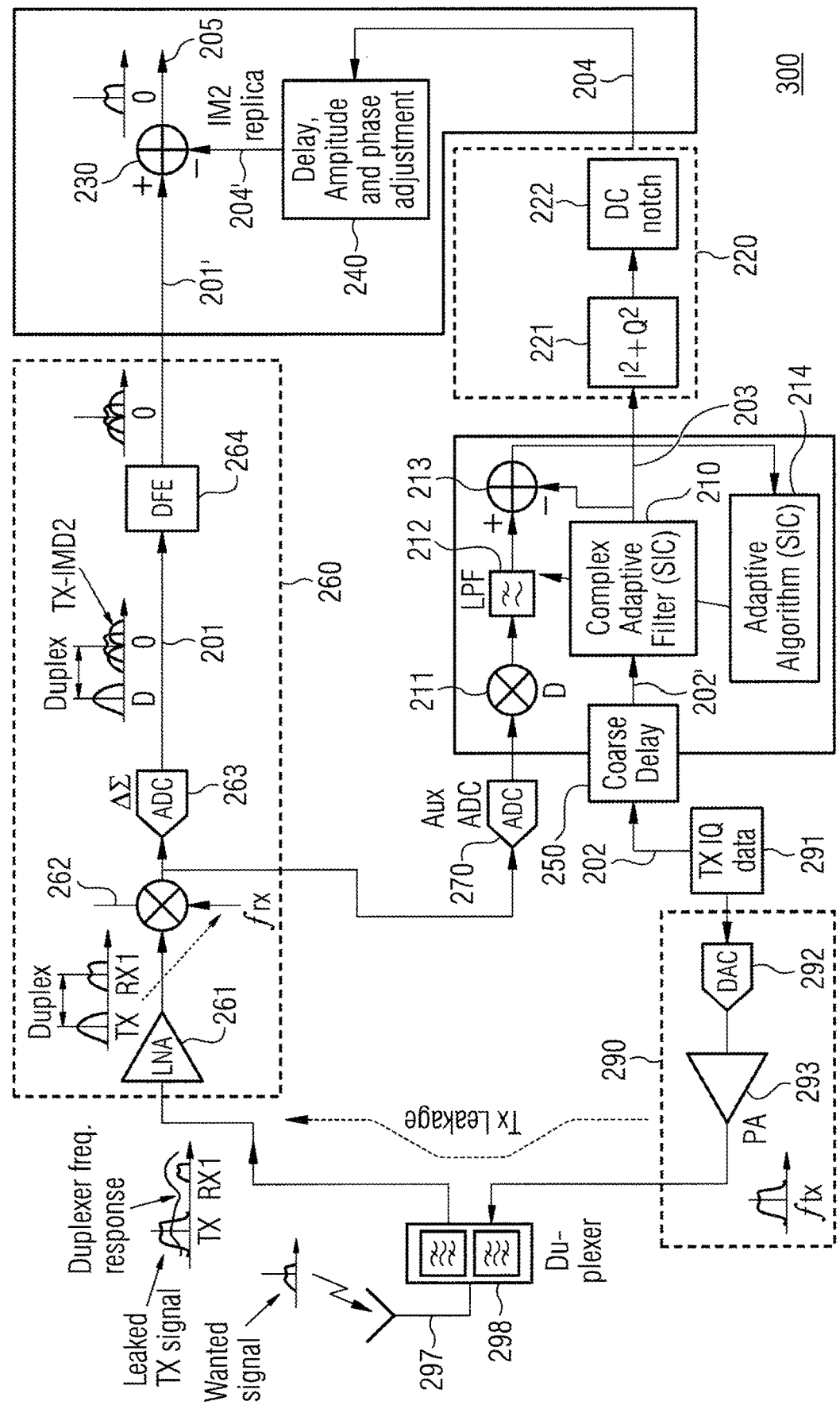
FIG. 3 illustrates a third example of a transceiver for reducing a distortion component within a baseband receive signal.

An alternative example of a transceiver 300 is illustrated in FIG. 3. The transceiver 300 is similar in structure to the transceiver 200 illustrated in FIG. 2. However, the signal related to the leakage component in the baseband receive signal is generated different. In the transceiver 200, the signal related to the leakage component in the baseband receive signal is based on the output signal 201 of the ADC 263 in the receive path 260 of the transceiver 200.

The transceiver 300, however, comprises an auxiliary ADC 270 configured to receive the input signal of the ADC 263 in the receive path 260 of the transceiver 200. That is, the ADC 270 receives the analog baseband receive signal.

An output signal of the ADC 270 (i.e. a digital replica of the analog baseband receive signal) is received by frequency shifter 211 (e.g. a mixer) of transceiver 300 instead of the output signal of ADC 263 as for the transceiver 200 illustrated in FIG. 2. The frequency shifter 211 then shifts again the frequency of the leakage component within the digital signal to the frequency of the baseband transmit signal 202'. The frequency shifted digital signal is again the filter by a low-pass filter 212 to remove (almost) all signal components from it except for the leakage component. Accordingly, another signal related to the leakage component in the baseband receive signal 201 is output by the low-pass filter 212. In other words, the signal related to the leakage component in the baseband receive signal is based on the output signal of the auxiliary ADC 270.

The signal related to the leakage component in the baseband receive signal may then again be used for adapting the configurable transfer function of the filter 210.

Using the auxiliary ADC 270 may allow to avoid the filtering and the noise shaping of the receiver path's ADC 263 in the signal related to the leakage component. Accordingly, a SNR of the modified baseband signal 203 of transceiver 300 may be increased compared to the SNR of the modified baseband signal 203 of transceiver 200.

In other words, splitting the auxiliary path takes place in front of the receive path's ADC 263 in the transceiver 300. An advantage of this concept may be that it avoids the filtering and noise shaping experienced by the ADC 263. Thus, a better SNR of the shaping signal may be achieved. The obvious disadvantage is using an extra auxiliary ADC 270. However, this may, e.g., be realized by a simple 4-bit flash ADC consuming only little extra power.

Figure 4:
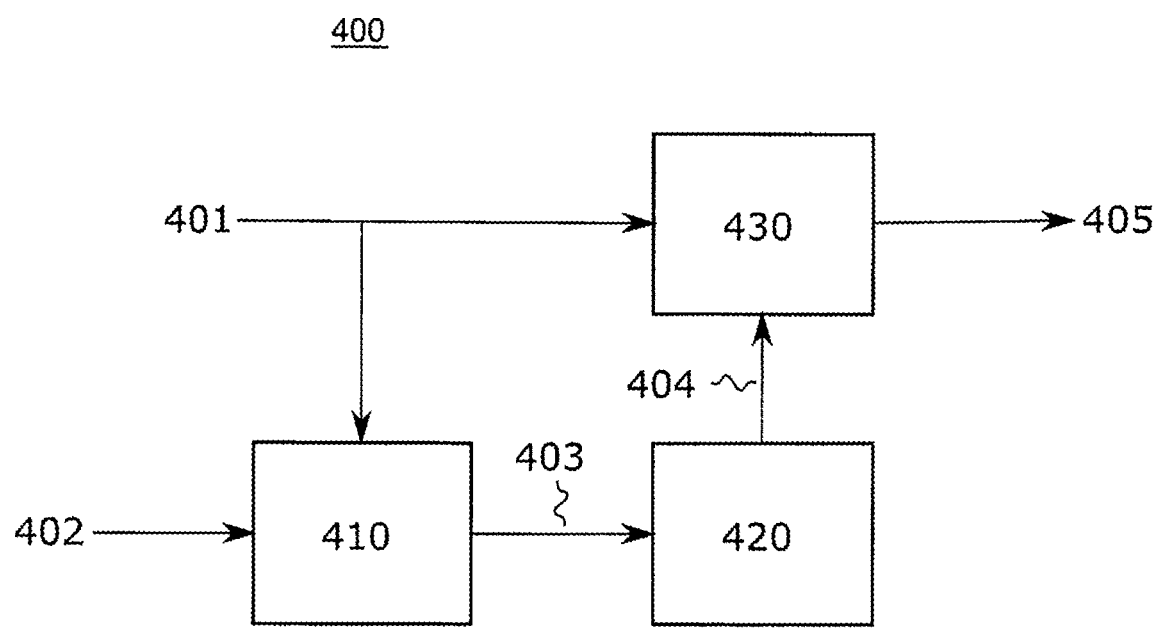
FIG. 4 illustrates a fourth example of a transceiver for reducing a distortion component within a baseband receive signal.

Another example of a transceiver 400 for reducing a distortion component within a baseband receive signal 401 (being processed in a receive path of the transceiver 400) is illustrated in FIG. 4.

The distortion component within the baseband receive signal 401 is caused by a baseband transmit signal 402 (e.g. processed in a transmit path of the transceiver 400). For example, the transceiver 400 (i.e. the transmit path of transceiver 400) may derive the baseband receive signal 401 from a RF signal. The RF signal may comprise an undesired signal component and a desired signal component. The desired signal component may, e.g., be a desired downlink-component transmitted by a base station, whereas the undesired signal component may, e.g., be a leakage or crosstalk component caused by the baseband transmit signal 402. When a transmit path and a receive path of the transceiver 400 are coupled to a duplexer, the leakage or crosstalk component may, e.g., result from the duplexer's finite rejection of transmission signal components within a frequency band for reception. The distortion component and the leakage component may be caused by the undesired signal component of the RF signal, so that the distortion component within the baseband receive signal 401 is effectively caused by the baseband transmit signal 402.

The distortion component within the baseband receive signal 401 may, e.g., be a modulated spur. Due to intermixing of frequencies from multiple clock domains of the transceiver, a spur may occur at a mixer of a receive path. A spur is an undesired signal component occurring in addition to a dedicated local oscillator signal at an input of the receive path's mixer (e.g. due to crosstalk between multiple receive paths). The spur may have a frequency which is similar to a frequency of the undesired leakage component. Accordingly, the mixer may down-mix the undesired leakage component to the baseband due to the spur. The down-mixed leakage component may overlap with the down-mixed desired receive signal component and degrade the SNR of the baseband receive signal 401.

The transceiver 400 comprises a filter 410 configured to filter the baseband transmit signal 402 using a configurable transfer function in order to generate a modified baseband transmit signal 403. The configurable transfer function is based on a leakage component in the baseband receive signal 401. Also the leakage component in the baseband receive signal 401 is caused by the baseband transmit signal 402. The leakage component is different from the distortion component. For example, the leakage component may be generated via a (first) mechanism which is different from the (second) mechanism generating the distortion component. The leakage component may, e.g., be generated by down-mixing the undesired signal component of the RF signal in the mixer in the receive path of the transceiver 400 using the dedicated local oscillator signal for the receive path's mixer.

Using the leakage component in the baseband receive signal 401 for adapting the configurable transfer function of the filter 410 may allow to reproduce the transfer function of the duplexer for the transmit signal into the receive path. In other words, the configurable transfer function of the filter may be adapted such that it imitates a transfer characteristic of a channel providing the leaked RF transmit signal to the receive path (e.g. a duplexer to which the transmit path and the receiver are connected to). Accordingly, the filter 400 may shape the baseband transmit signal 402 in a way that corresponds to the distortion introduced by the duplexer in order to generate the modified baseband transmit signal 403.

Further, the transceiver 400 comprises a frequency shifter 420 configured to shift the frequency of the modified baseband transmit signal 403 to a position of the distortion component within the baseband receive signal 401 to generate a compensation signal 404. For example, the frequency shifter 420 may be implemented as a mixer. For determining the position of the distortion component within the baseband receive signal 401, i.e., the required shift frequency for shifting the frequency of the modified baseband transmit signal 403 to this frequency, a priori knowledge on the design of the transceiver 400 may be used. For example, possible frequencies of modulated spurs may be calculated based on the knowledge on the frequencies of local oscillator signals used within the transceiver 400.

By shifting the frequency of the modified baseband transmit signal 403, a signal component similar to the distortion component (i.e. the modulated spur) in the baseband receive signal 401 may be generated. Accordingly, the compensation signal 404 or a signal related to the compensation signal 404 (e.g. a delayed replica of the compensation signal 404) may comprise a signal component which is similar to the distortion component within the baseband receive signal 401.

Hence, the transceiver 400 further comprises a combiner 430 configured to combine the baseband receive signal 401 and the signal related to the compensation signal 404. For example, the combiner may be implemented as an adder. The transceiver 400 reduces the distortion component in the baseband receive signal 401 by modifying the baseband receive signal 401 based on the signal related to the compensation signal 404. Accordingly, a corrected baseband receive signal 405 may be provided by the transceiver 400.

In some examples, the transceiver 400 may further comprise a correlation unit configured to correlate the modified baseband transmit signal 403 and a signal related to the leakage component in the baseband receive signal 401, wherein the filter 410 is further configured to adapt the configurable transfer function based on a correlation result. The signal related to the leakage component may, e.g., be a delayed and/or filtered and/or frequency shifted replica of the baseband receive signal 401, which comprises the leakage component. By correlating the modified baseband transmit signal 403 and the signal related to the leakage component (e.g. by determining a difference between both signals), and adapting the configurable transfer function based on the correlation result (e.g. the difference between both signals), the configurable transfer function may be adapted such that it generates a (almost ideal) replica of the leakage component from the baseband transmit signal 402.

The configurable transfer function may in some examples, e.g., be a complex transfer function.

The transceiver 400 may comprise one or more additional optional features corresponding to one or more aspects of the proposed concept or one or more examples described below.

Generally speaking, some examples relate to a means for reducing a distortion component within a baseband receive signal, wherein the distortion component is caused by a baseband transmit signal. The means comprises a means for filtering the baseband transmit signal using a configurable transfer function to generate a modified baseband transmit signal, wherein the configurable transfer function is based on a leakage component in the baseband receive signal, the leakage component being caused by the baseband transmit signal. Furthermore, the means comprises means for shifting the frequency of the modified baseband transmit signal to a position of the distortion component within the baseband receive signal to generate a compensation signal. The means further comprises a means for combining the baseband receive signal and a signal related to the compensation signal.

In some examples, the means may further comprise a means for correlating the modified baseband transmit signal and a signal related to the leakage component in the baseband receive signal, wherein the means for filtering the baseband transmit signal is further configured to adapt the configurable transfer function based on a correlation result.

The means for reducing a distortion component within a baseband receive signal may be implemented by a transceiver for reducing a distortion component described above or below (e.g. FIG. 4). The means for filtering the baseband transmit signal may be implemented by a filter described above or below (e.g. FIG. 4). The means for generating an envelope signal may be implemented by a frequency shifter described above or below (e.g. FIG. 4). The means for combining may be implemented by a combiner described above or below (e.g. FIG. 4).

Figure 5:
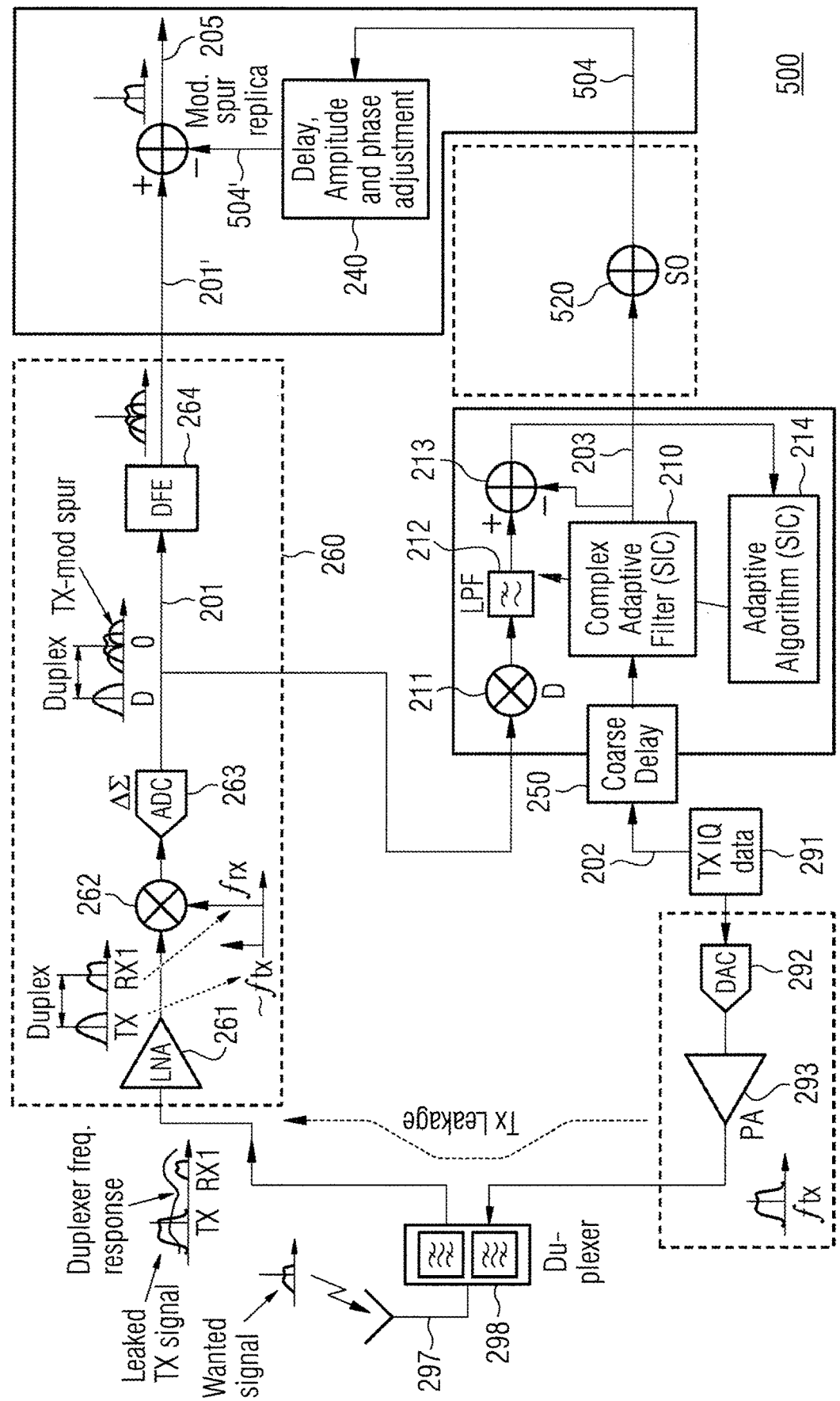
FIG. 5 illustrates a fifth example of a transceiver for reducing a distortion component within a baseband receive signal.

FIG. 5 illustrates another example of a transceiver 500 for reducing a distortion component within a baseband receive signal 501.

The transceiver 500 comprises a transmitter 290. As already described in connection with FIG. 2, the transmitter generates a RF transmit signal at a carrier frequency $f_{tx}$ which is modulated with the baseband transmit signal. The RF transmit signal is provided to the duplexer 298, which is connected to the antenna element 297, in order to radiate the RF transmit signal to the environment.

Further connected to the duplexer 298 is the receive path 260. The receive path receives a RF signal from the duplexer 298. Since the duplexer 298 cannot provide infinite isolation between both frequency bands, part of the RF transmit signal may leak into the frequency band for reception (for a detailed description see FIG. 2). Accordingly, the receive path 260 is provided with a RF signal which comprises a desired signal component, i.e., the RF receive signal, and an undesired signal component, i.e., the leaked RF transmit signal. In the frequency domain, the desired signal component and the undesired signal component of the RF signal are separated by the duplex distance.

The receive path 260 comprises the LNA 261, which may amplify a possibly weak RF signal while adding as little noise and distortion as possible to the signal.

The amplified RF signal is provided to the mixer 262. A local oscillator signal having a frequency $f_{rx}$ which is related to a frequency of the desired signal component of the RF signal is supplied to the mixer. For example, the frequency $f_{rx}$ of the local oscillator signal is tuned to a carrier frequency of the RF receive signal. Accordingly, the RF receive signal is down-mixed to the baseband by the mixer 262. However, also the leaked RF transmit signal is down-mixed by the mixer 262. Hence, the analog baseband receive signal comprises a desired baseband component related to the RF receive signal and an undesired leakage component related to the leaked RF transmit signal (i.e. the baseband transmit signal), wherein the desired baseband component and the undesired leakage component are again separated by the duplex distance.

However, in addition to the local oscillator signal, an additional signal component (spur) may be provided to the mixer 262. For example, the spur may be caused by an intermixing of frequencies generated within one or more other clock domains used within the transceiver 500. For example, the additional signal component may have a frequency which is similar or equal to a carrier frequency $f_{rx}$ of the leaked RF transmit signal, i.e., of the undesired signal component of the received RF signal. Accordingly, the leaked RF transmit signal is down-mixed to the baseband by the mixer 262 using the spur. That is, a modulated spur is generated as an additional distortion component within the analog baseband receive signal. As indicated in FIG. 5, the distortion component may overlap with the desired baseband component in the frequency domain. Accordingly, SNR of the analog baseband receive signal may be lowered due to the distortion component.

The analog baseband receive signal is converted to a digital signal by the ADC 263 in order to generate a digital baseband receive signal 201. However, apart from the desired baseband component also the leakage component and the distortion component are present in the digital baseband receive signal 201.

The digital baseband receive signal 201 is further processed by a DFE 264 for baseband processing, which is illustrated in FIG. 2 as part of the transceiver's receive path. The processing in the DFE 264 effectively acts as a low-pass filtering process, so that the DFE 264 filters (i.e. removes) the leakage component from the digital baseband receive signal 201. Accordingly, the filtered digital baseband receive signal 201' merely comprises the distortion component in addition to the desired baseband component.

In order to reduce the remaining distortion component within the filtered digital baseband receive signal 201', the transceiver 500 comprises further components described in the following.

The (digital) baseband transmit signal 202 provided by the baseband transmit data provision unit 291 is delayed by a delay element 250 in order to provide a delayed baseband transmit signal 202'. By delaying the baseband transmit signal 202, the processing time of the baseband transmit signal 202 in the transmit path 290 and the travelling time of the RF transmit signal through the duplexer may be taken into account for reducing the remaining distortion component within the filtered digital baseband receive signal 201'.

The baseband transmit signal 202' is filtered by a filter 210 using a configurable transfer function (e.g. a complex transfer function). In this respect, the configurable transfer function is based on the undesired leakage component within the baseband receive signal 201. In other words, the configurable transfer function is tuned based on the undesired leakage component. The filtered signal is output by the filter 210 as modified baseband transmit signal 203.

In order to tune the configurable transfer function, the digital baseband receive signal 201 is received by a frequency shifter 211 (e.g. a mixer). The frequency shifter 211 shifts the frequency of the leakage component within the digital baseband receive signal 201 to the frequency of the baseband transmit signal 202'. The frequency shifted digital baseband receive signal 201 is then filtered by a low-pass filter 212 to remove (almost) all signal components from it except for the leakage component. Accordingly, a signal related to the leakage component in the baseband receive signal 201 is output by the low-pass filter 212. In other words, the signal related to the leakage component in the baseband receive signal 201 is based on an output signal of the ADC 263 in the receive path 260 of the transceiver 200.

Alternatively, the transceiver 500 may comprising an auxiliary ADC configured to receive the input signal of the ADC 263 (i.e. the analog baseband receive signal) as described in connection with FIG. 2 for cancelling a second order IMD component from the baseband receive signal. Accordingly, the signal related to the leakage component in the baseband receive signal is based on an output signal of the auxiliary ADC. Using an auxiliary ADC may allow to avoid the filtering and the noise shaping of the receiver path's ADC 263 in the signal related to the leakage component. Accordingly, a SNR of the modified baseband signal 203 in the alternative example may be increased compared to the SNR of the modified baseband signal 203 of transceiver 500.

The signal related to the leakage component in the baseband receive signal 201 is then correlated with the modified baseband transmit signal 203 in a correlation unit 213. For example, the correlation unit 213 may be an adder which subtracts the signal related to the leakage component in the baseband receive signal 201 and the modified baseband transmit signal 203 from each other. By correlating both signals, one may determine how well the filtering process in the filter 210 reproduces the channel providing the leaked RF transmit signal to the receive path 260. The correlation result (e.g. an error signal indicating the difference between the signal related to the leakage component in the baseband receive signal 201 and the modified baseband transmit signal 203) is provided to a processing unit 214 executing an adaptive algorithm for adapting the configurable transfer function of the filter 210. The processing unit 214 executing the adaptive algorithm is a control portion of the filter 210. Based on the correlation result, the processing unit 214 executing the adaptive algorithm adapts (tunes) the configurable transfer function of the filter 210. Accordingly, the filter 210 may be operated adaptively in order to ensure an optimum reproduction of the channel providing the leaked RF transmit signal to the receive path 260.

The modified baseband transmit signal 203 is supplied to a frequency shifter 220 which is configured to generate a compensation signal 504 based on the modified baseband transmit signal 203. The frequency shifter 220 shifts the frequency of the modified baseband transmit signal 203 to a position of the distortion component within the baseband receive signal 201'. For example, the frequency shifter 220 may be implemented as a mixer. For determining the position of the distortion component within the baseband receive signal 201', i.e., the required shift frequency for shifting the frequency of the modified baseband transmit signal 203 to this frequency, a priori knowledge on the design of the transceiver 500 may be used. For example, knowledge on frequencies generated within one or more other clock domains used within the transceiver 500 may be used for calculating frequencies of possible modulated spurs or respective required shift frequencies.

By shifting the frequency of the modified baseband transmit signal 203, a signal component similar to the distortion component (i.e. the modulated spur) in the baseband receive signal 201' may be generated. Accordingly, the compensation signal 504 or a signal related to the compensation signal 504 (e.g. a delayed replica of the compensation signal 504) may comprise a signal component which is similar to the distortion component within the baseband receive signal 201'.

The compensation signal 504 is supplied to a signal adjustment unit 240 configured to generate a signal 504' related to the compensation signal. For generating the signal 504' related to the compensation signal, the signal adjustment unit 240 may, e.g., adjust an amplitude of the compensation signal 504, adjust a phase of the compensation signal 504, or delay the compensation signal 504. This may allow to reproduce the linear distortions introduced into the filtered digital baseband receive signal 201' by the ADC 263 and the DFE 264.

The signal adjustment unit 240 may comprise a configurable transfer function. In this respect, the signal adjustment unit 240 is configured to correlate the distortion component within the baseband receive signal 201' and the signal 504' related to the compensation signal. By correlating both signals, one may determine how well the foregoing processing reproduces the mechanism causing the distortion component in the baseband receive signal 201'.

The signal adjustment unit 240 is configured to adapt the configurable transfer function based on a correlation result (e.g. an error signal indicating the difference between the distortion component within the baseband receive signal 201' and the signal 504' related to the compensation signal). Accordingly, the signal adjustment unit 240 may be operated adaptively in order to ensure an optimum replica of the distortion component (e.g. modulated spur) in the baseband receive signal 201'.

In order to reduce (remove) the distortion component within the baseband receive signal 201', a combiner 230 combines the baseband receive signal 201' and the signal 504' related to the compensation signal. For example, the combiner 230 may be an adder configured to subtract the signal 504' related to the compensation signal from the baseband receive signal 201'. Since the signal 504' related to the compensation signal represents (essentially) a replica of the distortion component within the baseband receive signal 201', the distortion component within the baseband receive signal 201' may be reduced (removed/cancelled). Accordingly, a corrected baseband receive signal 205 may be output (generated) by the combiner 230, which contains (essentially) only the desired baseband component. Hence, a SNR of the corrected baseband receive signal 205 may be increased compared to the SNR of the baseband receive signal 201'.

The transceiver 500 may, e.g., be effective in a maximum throughput use case, where the RF receive signal has a high signal power compared to the RF transmit signal, which leaks into the receive path. Any distortion in this use case lowers the maximum data throughput, so that distortion reduction (cancelling) is mandatory. In the maximum throughput use case, the SNR of the receive signal may reach up to 30 Decibel (dB). The high SNR acts as noise for the generation of the compensation signal. However, since the effective channel providing the leaked RF transmit signal to the receive path is estimated according to the proposed concept, the strong RF receive signal does not influence the channel estimation. Hence, the modified baseband transmit signal may be generated with a good SNR. Accordingly, effective modulated spur cancelling may be provided also for the maximum throughput use case.

In other words, various cancellation techniques using the original TX data may be employed in order to cancel linearly distorted modulated spurs in a use case, in which the RF receive signal has a low signal power compared to the RF transmit signal (REF SENSE). However, the cancellation becomes more challenging in a maximum throughput use case, where the SNR of the RX signal may reach 30 dB. This high SNR of the RX signal acts as noise for the modulated spur replica creation. The proposed concept may be an effective approach to cancel modulated spurs in the maximum throughput use case. The TX-RX channel is estimated first, so that the strong wanted signal doesn't influence the estimation. The original TX signal is passed through this estimated channel to generate the leaked TX signal with very good SNR. This signal is then shifted to spur offset. The shifted signal is the amplitude and/or phase adjusted using, e.g., a low tap adaptive filter to generate a modulated spur replica. This replica is then subtracted from the received signal to cancel the interference.

Figure 6:
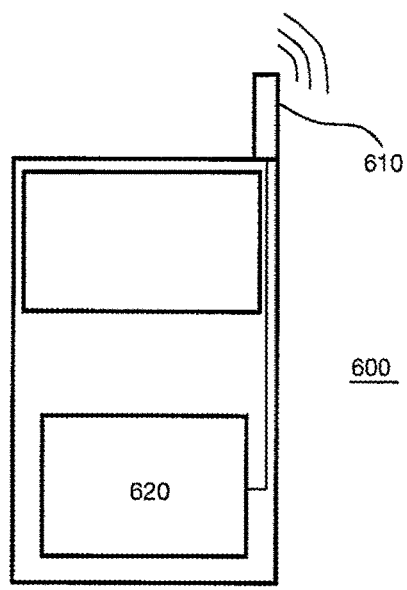
FIG. 6 illustrates an example of a mobile communications device comprising a transceiver for reducing a distortion component within a baseband receive signal.

An example of an implementation using a transceiver for reducing a distortion component within a baseband receive signal according to one or more aspects of the proposed concept or one or more examples described above is illustrated in FIG. 6. FIG. 6 schematically illustrates an example of a mobile communications device or mobile phone or user equipment 600 comprising a transceiver 620 according to an example described herein. An antenna element 610 of the mobile communications device 600 may be coupled to the transceiver 620. To this end, mobile communications devices may be provided allowing relaxed specifications for front-end components (e.g. duplexer) and to reduce costly factory calibration processes.

Figure 7:
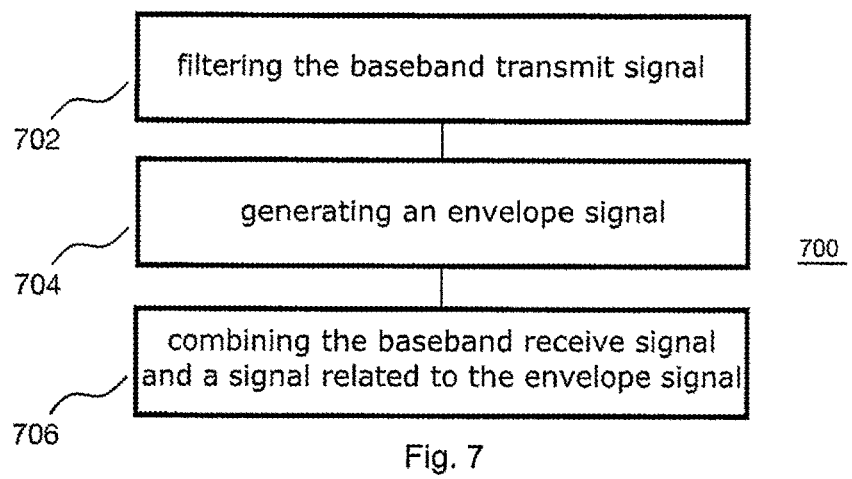
FIG. 7 illustrates a flowchart of a first example of a method for reducing a distortion component within a baseband receive signal.

An example of a method 700 for reducing a distortion component within a baseband receive signal is illustrated by means of a flowchart in FIG. 7. The distortion component is caused by a baseband transmit signal. The method 700 comprises filtering 702 the baseband transmit signal using a configurable transfer function to generate a modified baseband transmit signal. The configurable transfer function is based on a leakage component in the baseband receive signal, wherein the leakage component is caused by the baseband transmit signal. Moreover, the method 700 comprises generating 704, based on the modified baseband transmit signal, an envelope signal representing the envelope of the modified baseband transmit signal. The method 700 further comprises combining 706 the baseband receive signal and a signal related to the envelope signal.

More details and aspects of the method are mentioned in connection with the proposed concept or one or more examples described above (e.g. FIGS. 1-3). The method may comprise one or more additional optional features corresponding to one or more aspects of the proposed concept or one or more examples described above.

Figure 8:
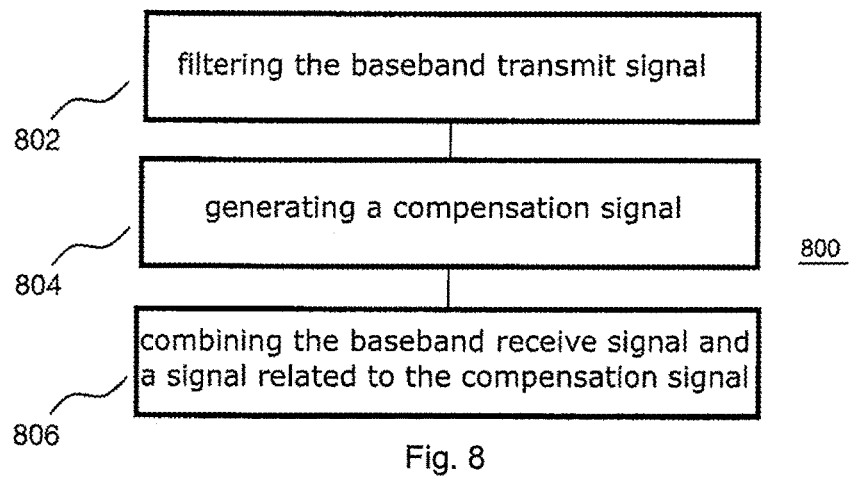
FIG. 8 illustrates a flowchart of a second example of a method for reducing a distortion component within a baseband receive signal.

An example of another method 800 for reducing a distortion component within a baseband receive signal is illustrated by means of a flowchart in FIG. 8. The distortion component is caused by a baseband transmit signal. The method 800 comprises filtering 802 the baseband transmit signal using a configurable transfer function to generate a modified baseband transmit signal. The configurable transfer function is based on a leakage component in the baseband receive signal, wherein the leakage component is caused by the baseband transmit signal. Moreover, the method 800 comprises shifting 804 the frequency of the modified baseband transmit signal to a position of the distortion component within the baseband receive signal to generate a compensation signal. The method 800 further comprises combining 806 the baseband receive signal and a signal related to the compensation signal.

More details and aspects of the method are mentioned in connection with the proposed concept or one or more examples described above (e.g. FIGS. 4 & 5). The method may comprise one or more additional optional features corresponding to one or more aspects of the proposed concept or one or more examples described above.

The examples as described herein may be summarized as follows:

Example 1 is transceiver for reducing a distortion component within a baseband receive signal, wherein the distortion component is caused by a baseband transmit signal, comprising: a filter configured to filter the baseband transmit signal using a configurable transfer function to generate a modified baseband transmit signal, wherein the configurable transfer function is based on a leakage component in the baseband receive signal, the leakage component being caused by the baseband transmit signal; a processing unit configured to generate, based on the modified baseband transmit signal, an envelope signal representing the envelope of the modified baseband transmit signal; and a combiner configured to combine the baseband receive signal and a signal related to the envelope signal.

In example 2, the transceiver of example 1 further comprises a correlation unit configured to correlate the modified baseband transmit signal and a signal related to the leakage component in the baseband receive signal, wherein the filter is further configured to adapt the configurable transfer function based on a correlation result.

In example 3, the configurable transfer function of the transceiver of example 2 is a complex transfer function.

In example 4, the signal related to the leakage component in the baseband receive signal is based on an output signal of an analog-to-digital converter in a receive path of the transceiver of example 2 or example 3, the receive path processing the baseband receive signal.

In example 5, the transceiver of example 2 or example 3 further comprises an auxiliary analog-to-digital converter configured to receive an input signal of an analog-to-digital converter in a receive path of the transceiver, the receive path processing the baseband receive signal, wherein the signal related to the leakage component in the baseband receive signal is based on an output signal of the auxiliary analog-to-digital converter.

In example 6, the processing unit of the transceiver of any of the preceding examples is configured to generate the envelope signal DC-balanced.

In example 7, the transceiver of any of the preceding examples further comprises a signal adjustment unit configured to adjust an amplitude or a phase of the envelope signal, or to delay the envelope signal for generating the signal related to the envelope signal.

In example 8, the signal adjustment unit of the transceiver of example 7 comprises a configurable transfer function, wherein the signal adjustment unit is configured to correlate the distortion component within the baseband receive signal and the signal related to the envelope signal, and wherein the signal adjustment unit is further configured to adapt the configurable transfer function based on a correlation result.

In example 9, the distortion component is a second order intermodulation distortion in the transceiver of any of the preceding examples.

In example 10, the transceiver of any of the preceding examples is configured to derive the baseband receive signal from a radio frequency signal, wherein the distortion component and the leakage component are caused by an undesired signal component of the radio frequency signal, the undesired signal component being caused by the baseband transmit signal.

In example 11, the transceiver of example 10 further comprises a duplexer configured to provide the radio frequency signal.

In example 12, the transceiver of example 11 further comprises a transmit path coupled to the duplexer and configured to supply, to the duplexer, a radio frequency transmit signal based on the baseband transmit signal.

Example 13 is a transceiver for reducing a distortion component within a baseband receive signal, wherein the distortion component is caused by a baseband transmit signal, comprising: a filter configured to filter the baseband transmit signal using a configurable transfer function to generate a modified baseband transmit signal, wherein the configurable transfer function is based on a leakage component in the baseband receive signal, the leakage component being caused by the baseband transmit signal; a frequency shifter configured to shift the frequency of the modified baseband transmit signal to a position of the distortion component within the baseband receive signal to generate a compensation signal; and a combiner configured to combine the baseband receive signal and a signal related to the compensation signal.

In example 14, the transceiver of example 13 further comprises a correlation unit configured to correlate the modified baseband transmit signal and a signal related to the leakage component in the baseband receive signal, wherein the filter is further configured to adapt the configurable transfer function based on a correlation result.

In example 15, the configurable transfer function of the transceiver of example 14 is a complex transfer function.

In example 16, the signal related to the leakage component in the baseband receive signal is based on an output signal of an analog-to-digital converter in a receive path of the transceiver of example 14 or example 15, the receive path processing the baseband receive signal.

In example 17, the transceiver of example 14 or example 15 further comprises an auxiliary analog-to-digital converter configured to receive an input signal of an analog-to-digital converter in a receive path of the transceiver, the receive path processing the baseband receive signal, wherein the signal related to the leakage component in the baseband receive signal is based on an output signal of the auxiliary analog-to-digital converter.

In example 18, the transceiver of any of examples 13 to 17 further comprises a signal adjustment unit configured to adjust an amplitude or a phase of the compensation signal, or to delay the compensation signal for generating the signal related to the compensation signal.

In example 19, the signal adjustment unit of the transceiver of example 18 comprises a configurable transfer function, wherein the signal adjustment unit is configured to correlate the distortion component within the baseband receive signal and the signal related to the compensation signal, and wherein the signal adjustment unit is further configured to adapt the configurable transfer function based on a correlation result.

In example 20, the distortion component is a modulated spur in the transceiver of any of examples 13 to 19.

In example 21, the transceiver of any of examples 13 to 20 is configured to derive the baseband receive signal from a radio frequency signal, and wherein the distortion component and the leakage component are caused by an undesired signal component of the radio frequency signal, the undesired signal component being caused by the baseband transmit signal.

In example 22, the transceiver of example 21 further comprises a duplexer configured to provide the radio frequency signal.

In example 23, the transceiver of example 22 further comprises a transmit path coupled to the duplexer and configured to supply, to the duplexer, a radio frequency transmit signal based on the baseband transmit signal.

Example 24 is a mobile communications device comprising a transceiver according to any of examples 1 to 12 or a transceiver according to any of examples 13 to 23.

In example 25, the mobile communications device of example 24 further comprises at least one antenna element coupled to the transceiver.

Example 26 is a means for reducing a distortion component within a baseband receive signal, wherein the distortion component is caused by a baseband transmit signal, comprising: a means for filtering the baseband transmit signal using a configurable transfer function to generate a modified baseband transmit signal, wherein the configurable transfer function is based on a leakage component in the baseband receive signal, the leakage component being caused by the baseband transmit signal; a means for generating, based on the modified baseband transmit signal, an envelope signal representing the envelope of the modified baseband transmit signal; and a means for combining the baseband receive signal and a signal related to the envelope signal.

In example 27, the means of example 26 further comprises a means for correlating the modified baseband transmit signal and a signal related to the leakage component in the baseband receive signal, wherein the means for filtering the baseband transmit signal is further configured to adapt the configurable transfer function based on a correlation result.

Example 28 is a means for reducing a distortion component within a baseband receive signal, wherein the distortion component is caused by a baseband transmit signal, comprising: a means for filtering the baseband transmit signal using a configurable transfer function to generate a modified baseband transmit signal, wherein the configurable transfer function is based on a leakage component in the baseband receive signal, the leakage component being caused by the baseband transmit signal; a means for shifting the frequency of the modified baseband transmit signal to a position of the distortion component within the baseband receive signal to generate a compensation signal; and a means for combining the baseband receive signal and a signal related to the compensation signal.

In example 29, the means of example 28 further comprises a means for correlating the modified baseband transmit signal and a signal related to the leakage component in the baseband receive signal, wherein the means for filtering the baseband transmit signal is further configured to adapt the configurable transfer function based on a correlation result.

Example 30 is a method for reducing a distortion component within a baseband receive signal, wherein the distortion component is caused by a baseband transmit signal, comprising: filtering the baseband transmit signal using a configurable transfer function to generate a modified baseband transmit signal, wherein the configurable transfer function is based on a leakage component in the baseband receive signal, the leakage component being caused by the baseband transmit signal; generating, based on the modified baseband transmit signal, an envelope signal representing the envelope of the modified baseband transmit signal; and combining the baseband receive signal and a signal related to the envelope signal.

In example 31, the method of example 30 further comprises: correlating the modified baseband transmit signal and a signal related to the leakage component in the baseband receive signal; and adapting the configurable transfer function based on a correlation result.

In example 32, the configurable transfer function in the method of example 31 is a complex transfer function.

In example 33, the signal related to the leakage component in the baseband receive signal is based on an output signal of an analog-to-digital converter in a receive path of a transceiver in the method of example 31 or example 32, the receive path processing the baseband receive signal.

In example 34, the method of example 31 or example 32 further comprises receiving, by an auxiliary analog-to-digital converter, an input signal of an analog-to-digital converter in a receive path of a transceiver, the receive path processing the baseband receive signal, wherein the signal related to the leakage component in the baseband receive signal is based on an output signal of the auxiliary analog-to-digital converter.

In example 35, the envelope signal is generated DC-balanced in the method of any of the preceding examples.

In example 36, the method of any of the preceding examples further comprises generating the signal related to the envelope signal by adjusting an amplitude or a phase of the envelope signal, or by delaying the envelope signal.

In example 37, the signal related to the envelope signal is generated using a configurable transfer function in the method of example 36, wherein the method further comprises: correlating the distortion component within the baseband receive signal and the signal related to the envelope signal; and adapting the configurable transfer function based on a correlation result.

In example 38, the distortion component is a second order intermodulation distortion in the method of any of the preceding examples.

In example 39, the baseband receive signal is derived from a radio frequency signal in the method of any of the preceding examples, wherein the distortion component and the leakage component are caused by an undesired signal component of the radio frequency signal, the undesired signal component being caused by the baseband transmit signal.

Example 40 is a method for reducing a distortion component within a baseband receive signal, wherein the distortion component is caused by a baseband transmit signal, comprising: filtering the baseband transmit signal using a configurable transfer function to generate a modified baseband transmit signal, wherein the configurable transfer function is based on a leakage component in the baseband receive signal, the leakage component being caused by the baseband transmit signal; shifting the frequency of the modified baseband transmit signal to a position of the distortion component within the baseband receive signal to generate a compensation signal; and combining the baseband receive signal and a signal related to the compensation signal.

In example 41, the method of example 40 further comprises: correlating the modified baseband transmit signal and a signal related to the leakage component in the baseband receive signal; and adapting the configurable transfer function based on a correlation result.

In example 42, the configurable transfer function is a complex transfer function in the method of example 41.

In example 43, the signal related to the leakage component in the baseband receive signal is based on an output signal of an analog-to-digital converter in a receive path of a transceiver in the method of example 41 or example 42, the receive path processing the baseband receive signal.

In example 44, the method of example 41 or example 42 further comprises receiving, by an auxiliary analog-to-digital converter, an input signal of an analog-to-digital converter in a receive path of a transceiver, the receive path processing the baseband receive signal, wherein the signal related to the leakage component in the baseband receive signal is based on an output signal of the auxiliary analog-to-digital converter.

In example 45, the method of any of examples 40 to 44 further comprises generating the signal related to the compensation signal by adjusting an amplitude or a phase of the compensation signal, or by delaying the compensation signal.

In example 46, the signal related to the compensation signal is generated using a configurable transfer function in the method of example 45, wherein the method further comprises: correlating the distortion component within the baseband receive signal and the signal related to the compensation signal; and adapting the configurable transfer function based on a correlation result.

In example 47, the distortion component is a modulated spur in the method of any of examples 40 to 46.

In example 48, the baseband receive signal is derived from a radio frequency signal in the method of any of examples 40 to 47, wherein the distortion component and the leakage component are caused by an undesired signal component of the radio frequency signal, the undesired signal component being caused by the baseband transmit signal.

Example 49 is a computer readable storage medium having stored thereon a program having a program code for performing the method of any of examples 30 to 48, when the program is executed on a computer or processor.

Example 50 is a computer program having a program code configured to perform the method of any of examples 30 to 48, when the computer program is executed on a computer or processor.

The aspects and features mentioned and described together with one or more of the previously detailed examples and figures, may as well be combined with one or more of the other examples in order to replace a like feature of the other example or in order to additionally introduce the feature to the other example.

Examples may further be a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other example examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A transceiver for reducing a distortion component within a baseband receive signal, wherein the distortion component is caused by a baseband transmit signal, comprising:

a filter configured to filter the baseband transmit signal using a configurable transfer function to generate a modified baseband transmit signal, wherein the configurable transfer function is based on a leakage component in the baseband receive signal received by a correlation unit via a low-pass filter, wherein the filter is configured to adapt the configurable transfer function based on a correlation result of the correlation unit, the leakage component being caused by the baseband transmit signal;

a processing unit configured to generate, based on the modified baseband transmit signal, an envelope signal representing the envelope of the modified baseband transmit signal; and a combiner configured to combine the baseband receive signal and a signal related to the envelope signal.

2. The transceiver of claim 1, further comprising the correlation unit configured to correlate the modified baseband transmit signal and a signal related to the leakage component in the baseband receive signal to produce the correlation result.

3. The transceiver of claim 2, wherein the signal related to the leakage component in the baseband receive signal is based on an output signal of an analog-to-digital converter in a receive path of the transceiver, the receive path processing the baseband receive signal.

4. The transceiver of claim 2, further comprising an auxiliary analog-to-digital converter configured to receive an input signal of an analog-to-digital converter in a receive path of the transceiver, the receive path processing the baseband receive signal, wherein the signal related to the leakage component in the baseband receive signal is based on an output signal of the auxiliary analog-to-digital converter.

5. The transceiver of claim 1, wherein the processing unit is configured to generate the envelope signal direct-current-balanced.

6. The transceiver of claim 1, further comprising a signal adjustment unit configured to adjust an amplitude or a phase of the envelope signal, or to delay the envelope signal for generating the signal related to the envelope signal.

7. The transceiver of claim 6, wherein the signal adjustment unit comprises a configurable transfer function, wherein the signal adjustment unit is configured to correlate the distortion component within the baseband receive signal and the signal related to the envelope signal, and wherein the signal adjustment unit is further configured to adapt the configurable transfer function based on a correlation result.

8. The transceiver of claim 1, wherein the distortion component is a second order intermodulation distortion.

9. The transceiver of claim 1, wherein the transceiver is configured to derive the baseband receive signal from a radio frequency signal, and wherein the distortion component and the leakage component are caused by an undesired signal component of the radio frequency signal, the undesired signal component being caused by the baseband transmit signal.

10. A method for reducing a distortion component within a baseband receive signal, wherein the distortion component is caused by a baseband transmit signal, comprising:
    filtering by a filter the baseband transmit signal using a configurable transfer function to generate a modified baseband transmit signal, wherein the configurable transfer function is based on a leakage component in the baseband receive signal received by a correlation unit via a low-pass filter, wherein the filter is configured to adapt the configurable transfer function based on a correlation result of the correlation unit, the leakage component being caused by the baseband transmit signal;
    generating, based on the modified baseband transmit signal, an envelope signal representing the envelope of the modified baseband transmit signal; and
    combining the baseband receive signal and a signal related to the envelope signal.

11. The method of claim 10, further comprising:
    correlating the modified baseband transmit signal and a signal related to the leakage component in the baseband receive signal; and
    adapting the configurable transfer function based on the correlation result.

12. The method of claim 11, wherein the method further comprises receiving, by an auxiliary analog-to-digital converter, an input signal of an analog-to-digital converter in a receive path of a transceiver, the receive path processing the baseband receive signal, and wherein the signal related to the leakage component in the baseband receive signal is based on an output signal of the auxiliary analog-to-digital converter.

13. The method of claim 10, wherein the envelope signal is generated direct-current-balanced.

14. The method of claim 10 wherein the method further comprises generating the signal related to the envelope signal by adjusting an amplitude or a phase of the envelope signal, or by delaying the envelope signal.

15. The method of claim 14, wherein the signal related to the envelope signal is generated using the configurable transfer function, and wherein the method further comprises:
    correlating the distortion component within the baseband receive signal and the signal related to the envelope signal to obtain the correlation result; and
    adapting the configurable transfer function based on the correlation result.

\* \* \* \* \*